United States Patent [19]

Takano

[11] Patent Number: 4,485,886

[45] Date of Patent: Dec. 4, 1984

[54] AUTOMATIC TRANSMISSION FOR A FOUR-WHEEL DRIVE VEHICLE

[75] Inventor: Toshio Takano, Hamuramachi, Japan

[73] Assignee: Fuji Jokogyo Kabushiki Kaisha, Tokyo, Japan

[21] Appl. No.: 435,790

[22] Filed: Oct. 21, 1982

[30] Foreign Application Priority Data

Oct. 27, 1981 [JP] Japan .................................. 56-172526

[51] Int. Cl.³ ............................................. B60K 23/08
[52] U.S. Cl. .................................................. 180/247
[58] Field of Search ........................ 180/233, 247, 248; 74/473 R

[56] References Cited

U.S. PATENT DOCUMENTS 4,170,273  10/1979  Kodama et al. ..................... 180/233

FOREIGN PATENT DOCUMENTS 2065244  6/1981  United Kingdom ................ 180/247

Primary Examiner—Joseph F. Peters, Jr.
Assistant Examiner—Kenneth R. Rice
Attorney, Agent, or Firm—Martin A. Farber

[57] ABSTRACT

An automatic transmission for a four-wheel drive vehicle in which an oil pump is provided in a rear end portion of the automatic transmission for supplying pressure oil to the transmission. The output of the automatic transmission is transmitted to front wheels through a drive pinion engaged with an output gear of the transmission. A partition is secured to the rear end of the automatic transmission adjacent to the oil pump and an extension case is secured to the partition. A transfer drive shaft is connected to the driving pinion, and a fluid operated clutch is provided for operatively connecting the transfer drive shaft to rear wheels. The fluid operated clutch is operated by pressure oil supplied by the oil pump and the pressure oil is controlled by a pressure oil control device. The pressure oil control device is mounted on the partition and passages for supplying the pressure oil are formed in the partition and in a part of the transfer device.

4 Claims, 5 Drawing Figures

4,485,886

AUTOMATIC TRANSMISSION FOR A FOUR-WHEEL DRIVE VEHICLE

BACKGROUND OF THE INVENTION

The present invention relates to an automatic transmission for a four-wheel drive vehicle provided with a transfer clutch for changing two-wheel driving into four-wheel driving.

Since the automatic transmission for a four-wheel drive vehicle is the same as that of the two-wheel drive vehicle in operation, it is desirable to use an automatic transmission designed for a two-wheel drive vehicle for constructing a transmission system for a four-wheel drive vehicle from an economical point of view. To meet such a requirement, it is necessary to easily convert the automatic transmission for the two-wheel drive vehicle to the automatic transmission for the four-wheel drive vehicle without changing the construction of the automatic transmission.

There has been proposed a four-wheel drive vehicle provided with a fluid operated clutch as a transfer clutch. In such a four-wheel drive vehicle, the fluid operated clutch is operated by pressure oil produced by an oil pump in the automatic transmission for operating the transmission. Accordingly, a pressure oil control system must be provided for operating the fluid operated clutch. In order to connect the pressure oil control system for the clutch to the pressure oil system in the automatic transmission with ease, the pressure oil control system should be designed into an independent system separated from the pressure oil system in the automatic transmission.

SUMMARY OF THE INVENTION

The object of the present invention is to provide an automatic transmission for a four-wheel drive vehicle which may be easily constructed by using an automatic transmission for a two-wheel drive vehicle.

According to an aspect of the present invention, an automatic transmission for a four-wheel drive vehicle comprises an automatic transmission device for transmitting the output of an engine to front wheels, an oil pump provided in an end portion of the automatic transmission device for supplying pressure oil to the transmission, and a driving pinion operatively connected to an output gear of the automatic transmission device for transmitting the output thereof to a final reduction device of the front wheels. A partition is secured to a rear end of the automatic transmission device adjacent to the oil pump and an extension case is secured to the partition. A transfer device is provided for transmitting the output of the automatic transmission the rear wheels of the vehicle. The transfer device comprises a transfer drive shaft connected to the driving pinion, a transfer driven shaft operatively connected to the rear wheels, and a fluid operated clutch for operatively connecting the transfer drive shaft to the transfer driven shaft. A pressure oil control device is mounted on the partition and passages are formed in the partition and in the transfer driven shaft to supply the pressure oil to the fluid operated clutch to engage it.

The present invention will be more apparent from the following description made with reference to the accompanying drawings.

DETAILED DESCRIPTION OF THE PREFERRED EMBODIMENTS

Figure 1:
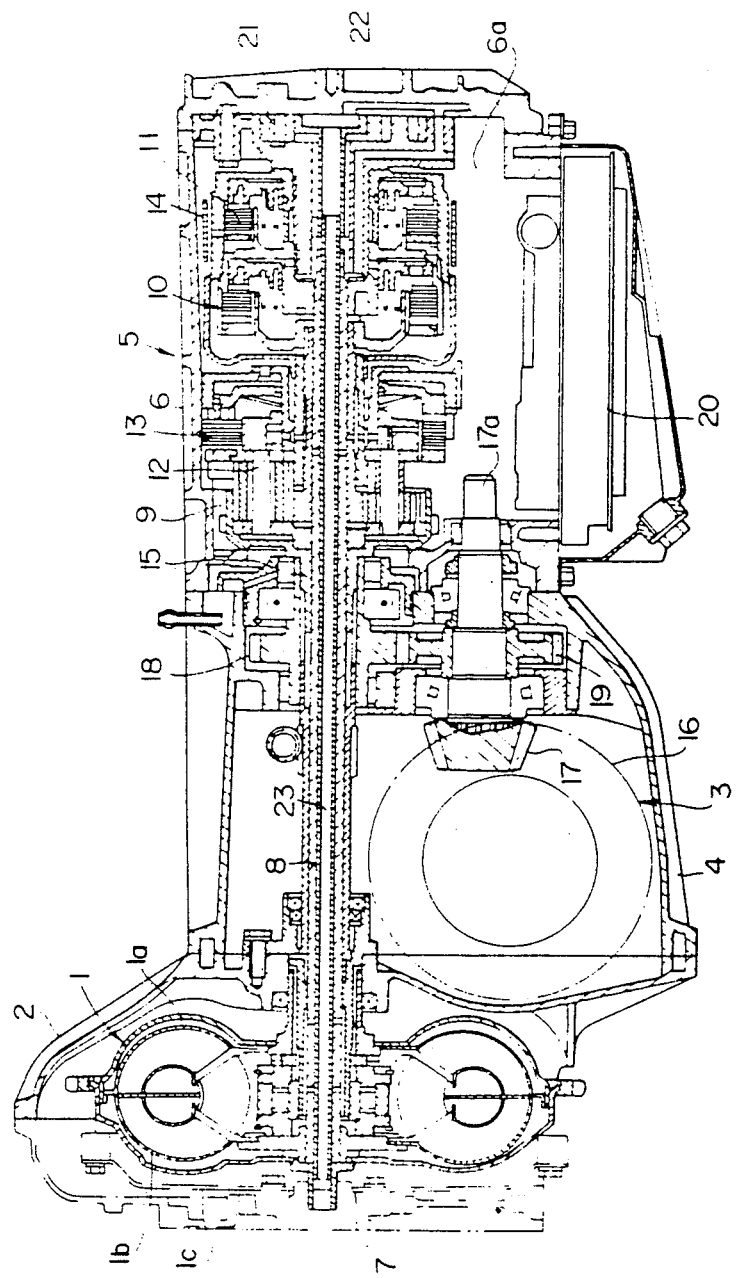
FIG. 1 is a sectional view showing an automatic transmission for a two-wheel drive vehicle.

Referring to FIG. 1 showing an automatic transmission for driving front wheels as an example of a two-wheel drive vehicle, the automatic transmission comprises a torque converter 1 in a converter housing 2, a final reduction device 3 for front wheels, a front differential case 4, and an automatic transmission device 5 provided in a transmission case 6.

The torque converter 1 comprises a pump impeller 1a and a turbine 1b. The pump impeller 1a is in direct connection with an engine crankshaft 7 through a drive plate 1c. A turbine shaft 8 extends from the turbine 1b to the automatic transmission device 5.

The automatic transmission device 5 comprises a planetary gear 9, clutches 10 and 11 for selectively transmitting the output of the turbine shaft 8 to the planetary gear 9, a one-way clutch 12, a brake 13 and a brake band 14 for selectively locking elements of the planetary gear 9.

The output of the automatic transmission device is transmitted to an output shaft 15 on which a drive gear 18 is securely mounted and which in turn engages with a driven gear 19. The driven gear 19 is securely mounted on a shaft 17a of a drive pinion 17. The drive pinion 17 engages with a crown gear 16 of the final reduction device 3 for driving the front wheels of the vehicle. In the transmission case 6, a space 6a is provided for extending the shaft 17a for driving the rear wheels of the vehicle and a valve block 20 is provided on the bottom of the transmission case 6.

An oil pump 21 is disposed in a rear portion of the automatic transmission and driven by the crankshaft 7 through a pump drive shaft 23 extending in the turbine shaft 8. A cover 22 is secured to the rear end of the transmission case 6.

The automatic transmission for driving the front wheels is so designed as to be used in an automatic transmission for a four-wheel drive vehicle.

Figure 2:
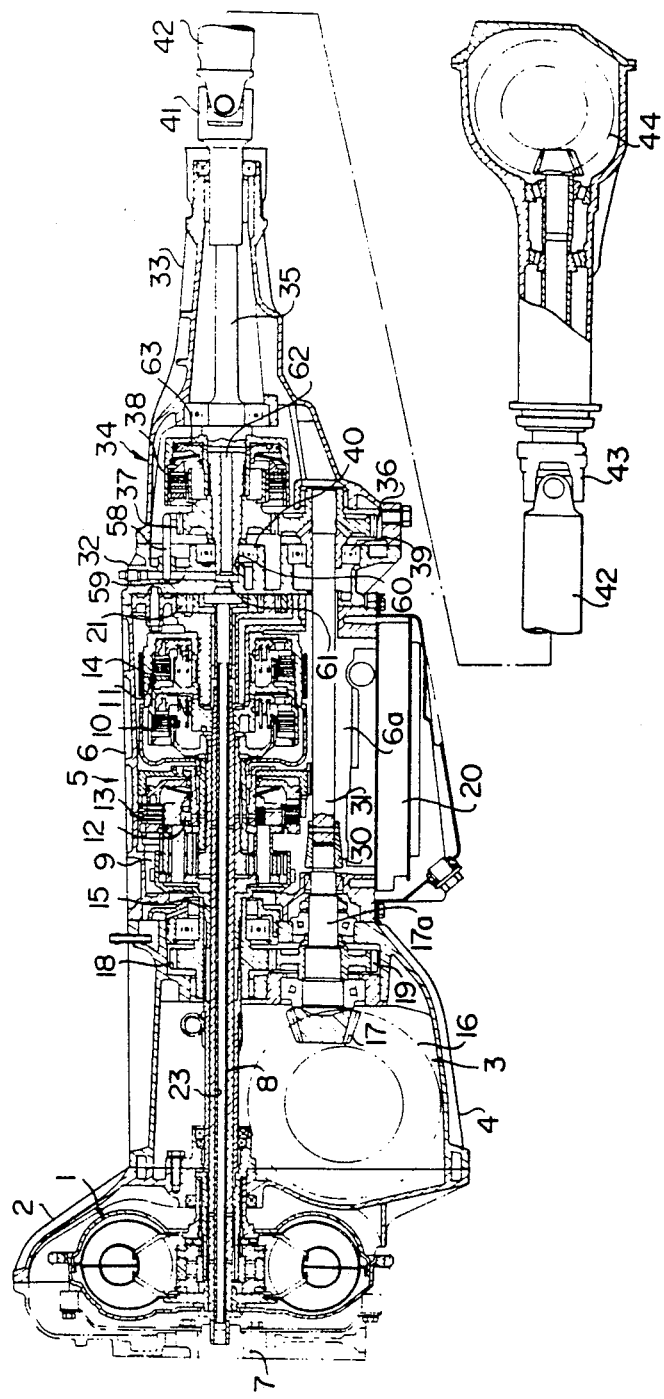
FIG. 2 is a sectional view showing an automatic transmission of the present invention.

FIG. 2 shows an automatic transmission according to the present invention in which the automatic transmission of FIG. 1 is used. The shaft 17a of the drive pinion 17 is connected to a transfer drive shaft 31 by a coupling 30. The shaft 17a extends to the rear portion of the transmission, passing through the space 6a. The rear portion of the transmission is closed by a partition 32 and an extension case 33 is secured to the rear portion of the transmission interposing the partition 32. A transfer device 34 is mounted in the extension case 33. The transfer drive shaft 31 extends across the partition 32 and is rotatably supported by a bearing 39 mounted in the partition 32. A first transfer gear 36 of the transfer device 34 is secured to the transfer drive shaft 31 at a rear end. The first transfer gear 36 is engaged with a second transfer gear 37 rotatably mounted on a transfer driven shaft 35. A fluid operated friction clutch 38 of the multiple-disk type is mounted on the transfer driven shaft 35 for jointly rotably engaging the gear 37 with the shaft 35. The transfer driven shaft 35 is rotatably supported in the partition by a bearing 40 at a front end thereof and operatively connected to a final reduction device 44 for the rear wheels through a propeller shaft 42 connected by joints 41 and 43. Thus, the output of the automatic transmission 5 is transmitted to the front wheels from the drive pinion 17 through the final reduction device 3 and also to the rear wheels through the shaft 31, the gears 36, 37, the clutch 38, the shaft 35, the propeller shaft 42 and the final reduction device 44.

A pressure oil control system will be described with reference to FIGS. 2 to 5. Since the fluid operated clutch 38 is adjacent to the oil pump 21 interposing the partition 32, the oil pump 21 is used as a pressure oil source for the clutch. As shown in FIG. 4, an oil passage 45 is bored in the partition 32 for communicating the output of the oil pump 21 with the outside of the partition. A a valve 49 has a valve body 50 which is secured to an outside wall 46 of the partition 32 by screws 48a interposing a spacer 48.

Figure 5:
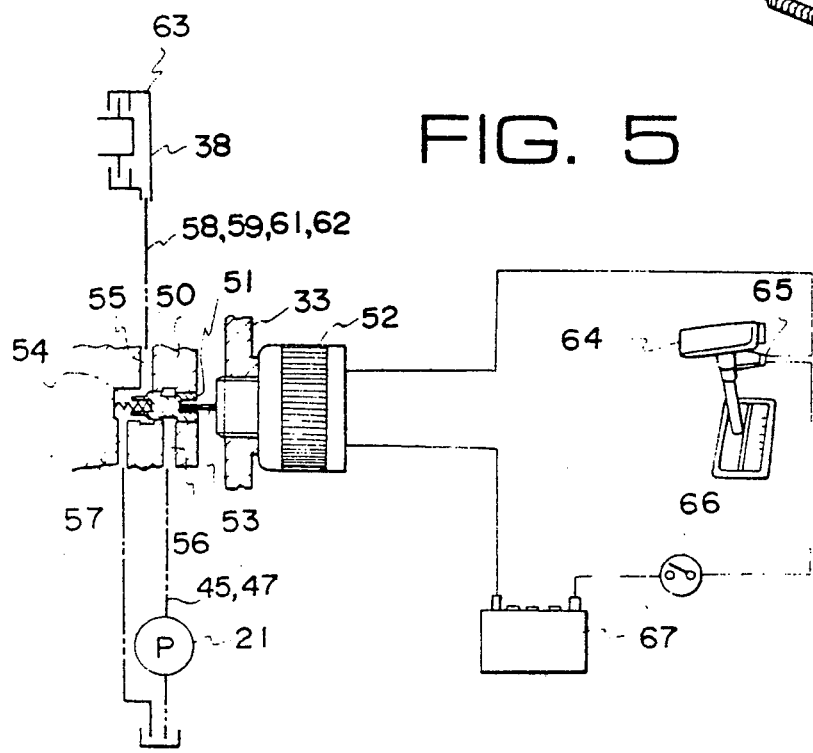
FIG. 5 is a diagram showing a pressure oil control system.

As shown in FIG. 5, in the valve body 50, a spool 51 is slidably mounted and connected to a plunger 53 of a solenoid 52 mounted on the extension case 33. The valve body 50 has an inlet port 56 communicated with the oil passage 45 of the partition 32 through a hole 47 formed in the spacer 48, an outlet port 55 communicated with the clutch 38, and a drain port 57. The spool 51 is biased to the right by a spring 54 to communicate the outlet port 55 with the drain port 57.

Figure 3:
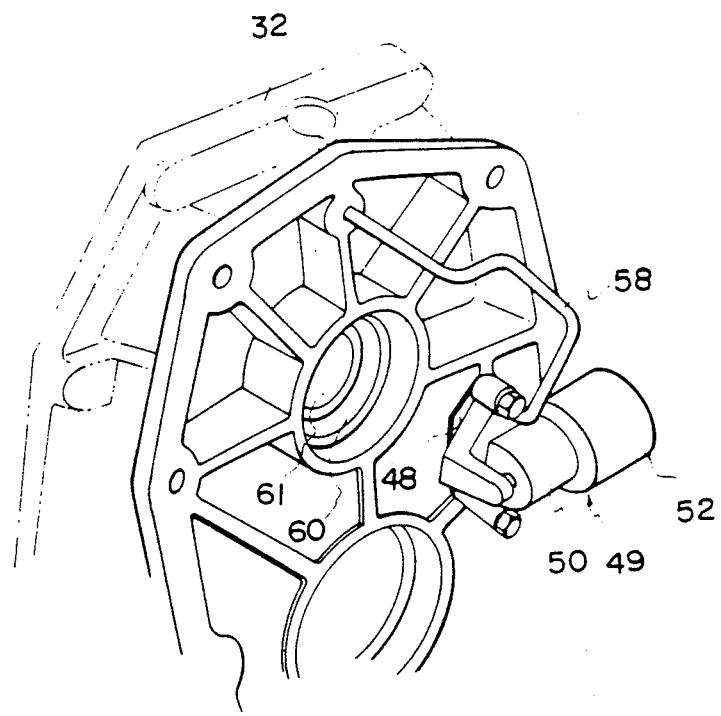
FIG. 3 is a perspective view showing a rear portion of the automatic transmission.
Figure 4:
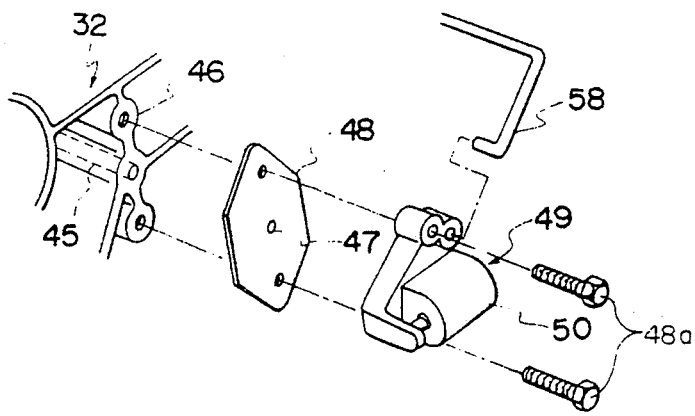
FIG. 4 is an exploded perspective view of a part of FIG. 3.

The outlet port 55 is connected with a pipe 58 which is connected to the partition 32 so as to communicate the outlet port 55 with a vertical passage 59 formed in the partition through the pipe 58 as shown in FIGS. 2 and 3. The vertical passage 59 communicates with an oil passage 62 formed in the shaft 35 through a cavity 61 formed at a front end of a hole 60 in the partition for the shaft 35. The oil passage 62 is communicates with a piston chamber 63 of the pressure oil clutch 38.

Referring to FIG. 5, the solenoid 52 is electrically connected to a battery 67 via a select switch 65 mounted on a select lever 64 and an ignition switch 66.

In operation, in the off state of the select switch 65, the solenoid 52 is de-energized, so that the spool 51 is biased to the right by the spring 54 to communicate the piston chamber 63 of the clutch 38 with an oil tank through the outlet port 55 and the drain port 57. Thus, the clutch 38 is disengaged, so that the output of the transmission 5 is not transmitted to the rear wheels. When the switch 65 is closed, the solenoid 52 is energized to move the spool 51 to the left. Accordingly, the inlet port 56 is communicated with the piston chamber 63 through the outlet port 55 to engage the clutch 38. Thus, the output of the transmission 5 is transmitted to the rear wheels to establish four-wheel driving.

From the foregoing, it will be understood that the present invention provides an automatic transmission for a four-wheel drive vehicle which can use an automatic transmission for a two-wheel drive vehicle without changing the construction thereof, because a pressure oil control system for a transfer clutch is independently provided.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. An automatic transmission having a torque converter for a four-wheel drive vehicle comprising:
   an automatic transmission device for operatively transmitting the output of an engine to driving wheels of the vehicle;
   a pump driving shaft operatively connected to said torque converter and extending inside a turbine shaft to an axial end of the automatic transmission device;
   means comprising an oil pump provided at the end of said automatic transmission device and operatively connected to an end of said pump drive shaft for supplying pressure oil to the transmission device;
   a driving pinion operatively connected to an output gear of said automatic transmission device for transmitting the output thereof to a final reduction device of a pair of the driving wheels;
   a partition adjacent to said oil pump and secured to the end of said automatic transmission device to close the automatic transmission device;
   an extension case secured to said partition;
   means comprising a transfer device for transmitting the output of said automatic transmission device to another pair of the driving wheels;
   said transfer device including a transfer drive shaft connected to said driving pinion, a transfer driven shaft operatively connected to said another pair of driving wheels, and means comprising a fluid operated clutch adjacent to said partition in said extension case for operatively connecting said transfer drive shaft to said transfer driven shaft; and
   means comprising a pressure oil control device mounted on said partition, said pressure oil control device including passages passing through said partition and valve means connected so as to supply the pressure oil from said oil pump to said fluid operated clutch through said valve means.

2. The automatic transmission for a four-wheel drive vehicle according to claim 1, wherein:
   said pressure oil control device comprises,
   a solenoid operated valve constituting said valve means and said passages for supplying the pressure oil from said oil pump to said fluid operated clutch, said passages are formed in said partition and
   additional passages formed in a part of said transfer driven shaft and communicating with said valve.

3. The automatic transmission for a four-wheel drive vehicle according to claim 2, wherein
   said transfer drive shaft and transfer driven shaft are rotatably supported in said partition, respectively.

4. The automatic transmission for a four-wheel drive vehicle according to claim 1, wherein
   said valve means comprises a control valve for controlling the pressure oil,
   an actuator means for actuating said control valve,
   means comprising a select switch disposed on a select lever of said vehicle for energizing said actuator means.

* * * * *